United States Patent [19]
Kursel et al.

[11] Patent Number: 5,835,018
[45] Date of Patent: Nov. 10, 1998

[54] LOW WATER LEVEL INDICATOR

[76] Inventors: Thomas C. Kursel, 3720 Nassau Dr., Brookfield, Wis. 53045; Robert E. Radke, 7720 N. 44th St., Brown Deer, Wis. 53223

[21] Appl. No.: 899,515

[22] Filed: Jul. 24, 1997

[51] Int. Cl.$^6$ ................................................. G08B 21/00
[52] U.S. Cl. ......................... 340/620; 340/618; 324/694; 73/304 R
[58] Field of Search .................................... 340/620, 618, 340/605, 604; 324/693, 696, 691; 73/304 R, 313

[56] References Cited

U.S. PATENT DOCUMENTS

| | | | |
|---|---|---|---|
| 4,796,017 | 1/1989 | Merenda | 340/620 |
| 4,806,847 | 2/1989 | Atherton et al. | 340/620 |
| 5,428,348 | 6/1995 | Gault | 340/618 |
| 5,493,277 | 2/1996 | Pierce et al. | 340/620 |
| 5,621,391 | 4/1997 | Elseth | 340/620 |
| 5,625,345 | 4/1997 | Stark et al. | 340/620 |
| 5,661,462 | 8/1997 | Shrewsbury-Gee | 340/618 |

*Primary Examiner*—Jeffery A. Hofsass
*Assistant Examiner*—Anh La
*Attorney, Agent, or Firm*—Donald J. Ersler

[57] ABSTRACT

A low water level indicator includes a detection assembly and an indicator unit. The detection assembly comprises a housing, a pair of electrodes, a control unit, and a battery. The indicator unit comprises a light emitting diode (LED) and a base plate. The housing is preferably molded as two halves which are joined at assembly. An adjustment rod is held by a first and second snap retainer at substantially the bottom of the housing. The adjustment rod is used to adjust the height of the bottom of the housing relative to a water container. The electronic control circuit is mounted in a top cavity. A hook rod is held by a top spring clip which is disposed at substantially the top of the housing. The hook rod is used to provide stability for the placement of the detection assembly. When the water level in a water container is too low, electrical current will no longer pass from the first electrode to the second electrode through the water. When current flow ceases between the first and second electrode, the LED will emit light until the water level is raised.

14 Claims, 4 Drawing Sheets

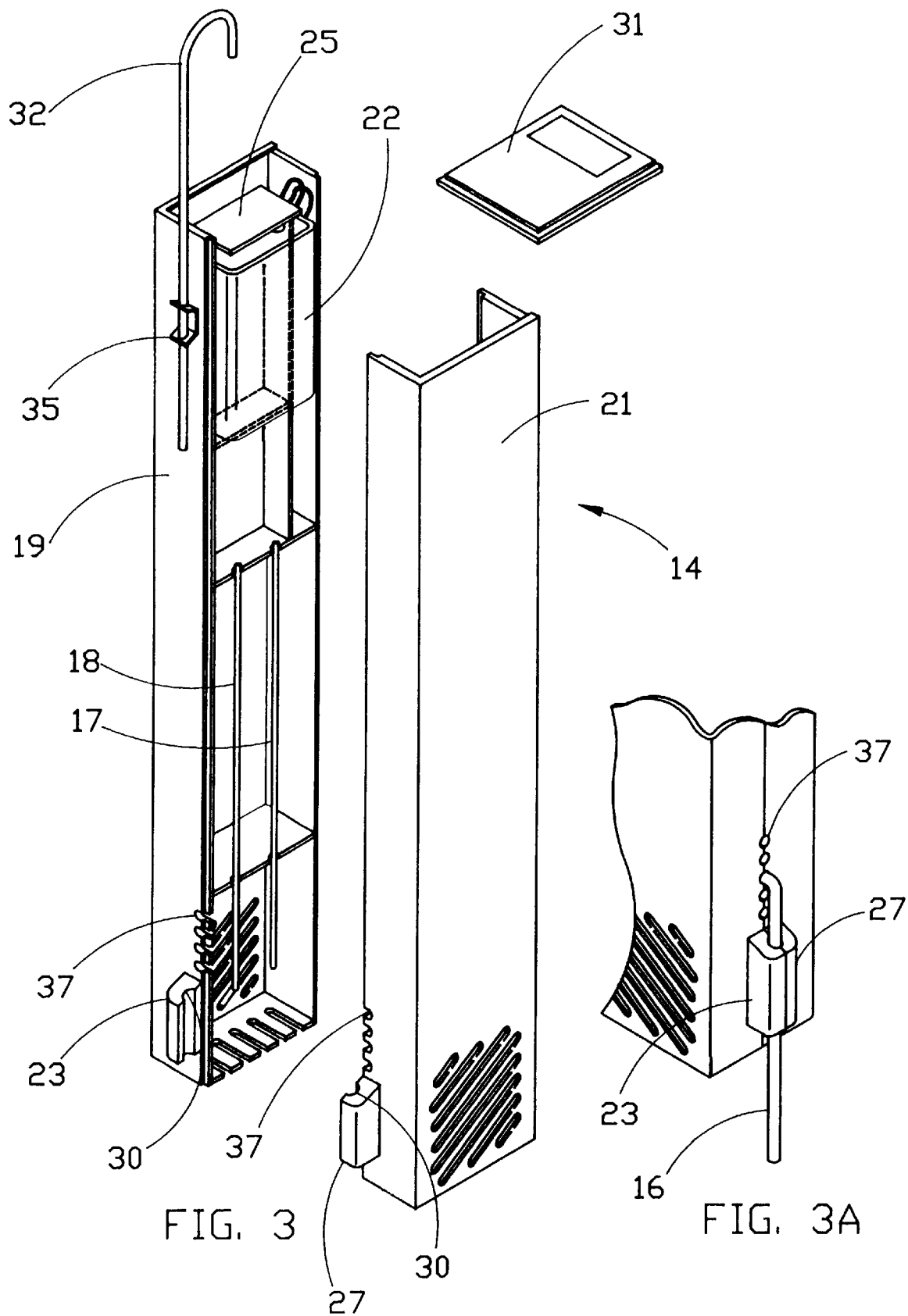

LOW WATER LEVEL INDICATOR

BACKGROUND OF THE INVENTION

1. Field of the Invention

The present invention relates generally to low water level indicators and more specifically to a low water level indicator which is more economical and easier to use than that of the prior art.

2. Discussion of the Prior Art

Every year, millions of families have cut Christmas trees in their homes. Unfortunately, these Christmas trees need to be kept in water to prevent them from drying out and becoming a fire hazard. The appearance of Christmas tree needles are also enhanced if the tree is kept moist with an adequate supply of water.

There have been a couple of patents directed to producing an economical low water level indicator for Christmas tree water containers. The first is Gault, U.S. Pat. No. 5,428,348. Gault utilizes a relatively complex electrical circuit to give an audio and visual alarm when the water level is too low. One drawback to this design is the method of suspending the sensor. The wire leading to the sensor must be wrapped around some object to suspend the sensor in the water. This requires time and effort. The second is Pierce, U.S. Pat. No. 5,493,277. Pierce requires the use of a momentary switch to determine whether the water level is too low.

Accordingly, there is a clearly felt need in the art for a low water level indicator which offers automatic operation, easy installation, a visual alarm, and can be economically manufactured.

SUMMARY OF THE INVENTION

The primary objective of the present invention is to provide a low water level indicator which offers automatic operation, easy installation, a visual alarm, and can be economically manufactured.

According to the present invention, a low water level indicator includes a detection assembly and an indicator unit. The detection assembly comprises a housing, a pair of electrodes, a battery, and an electronic circuit. The indicator unit comprises a base plate, and a light emitting diode (LED). The housing is preferably molded as two pieces which are joined together at assembly. The housing also has at least one opening in substantially the bottom thereof. An adjustment rod is held by a plastic snap retainer and is positioned with a plurality of support cavities at substantially the bottom of the housing. The adjustment rod is used to adjust the height of the bottom of the housing relative to a water container.

The electronic control circuit and the battery are mounted in the top cavity of the housing. The pair of electrodes extend downward from the electronic control circuit to the bottom of the housing. A hook rod is held by a top spring clip which is disposed at substantially the top of the housing. The hook is used to mount the detection assembly to a branch of the Christmas tree. A piece of wire, string, or a velcro strip may also be used to mount the detection assembly to the branch of the Christmas tree.

The installation and operation of the low water level indicator works as follows. The adjustable rod is positioned such that the housing is one inch off the bottom of the water container. The hook rod is fastened to a branch of the Christmas tree. Then the top spring clip is squeezed together such that the hook rod slides freely and the adjustable rod contacts the bottom of the water container. A battery is fastened to the battery connector at the top of the detection assembly. A battery plate is slid into a set of grooves at the top of the detection unit. When the water level is too low, electrical current will no longer pass from the first electrode to the second electrode through the water. When current flow ceases between the first and second electrode, the LED will flash until the water level is raised.

Accordingly, it is an object of the present invention to provide a low water level indicator which provides a flashing LED when the water level is too low.

It is a further object of the present invention to provide a low water level indicator which automatically indicates that the water level is too low.

It is yet a further object of the present invention to provide a low water level indicator which works without substantially draining the current from a battery.

It is yet a further object of the present invention to provide a low water level indicator which can be easily installed.

Finally, it is another object of the present invention to provide a low water level indicator which can be economically manufactured.

These and additional objects, advantages, features and benefits of the present invention will become apparent from the following specification.

BRIEF DESCRIPTION OF THE DRAWINGS

FIG. 3 is a perspective detail view of a housing used for the detection unit accordance with the present invention;

FIG. 3a is a partial perspective detail view of an adjustment rod on the bottom of a detection assembly in accordance with the present invention.

DETAILED DESCRIPTION OF THE PREFERRED EMBODIMENTS

Figure 1:
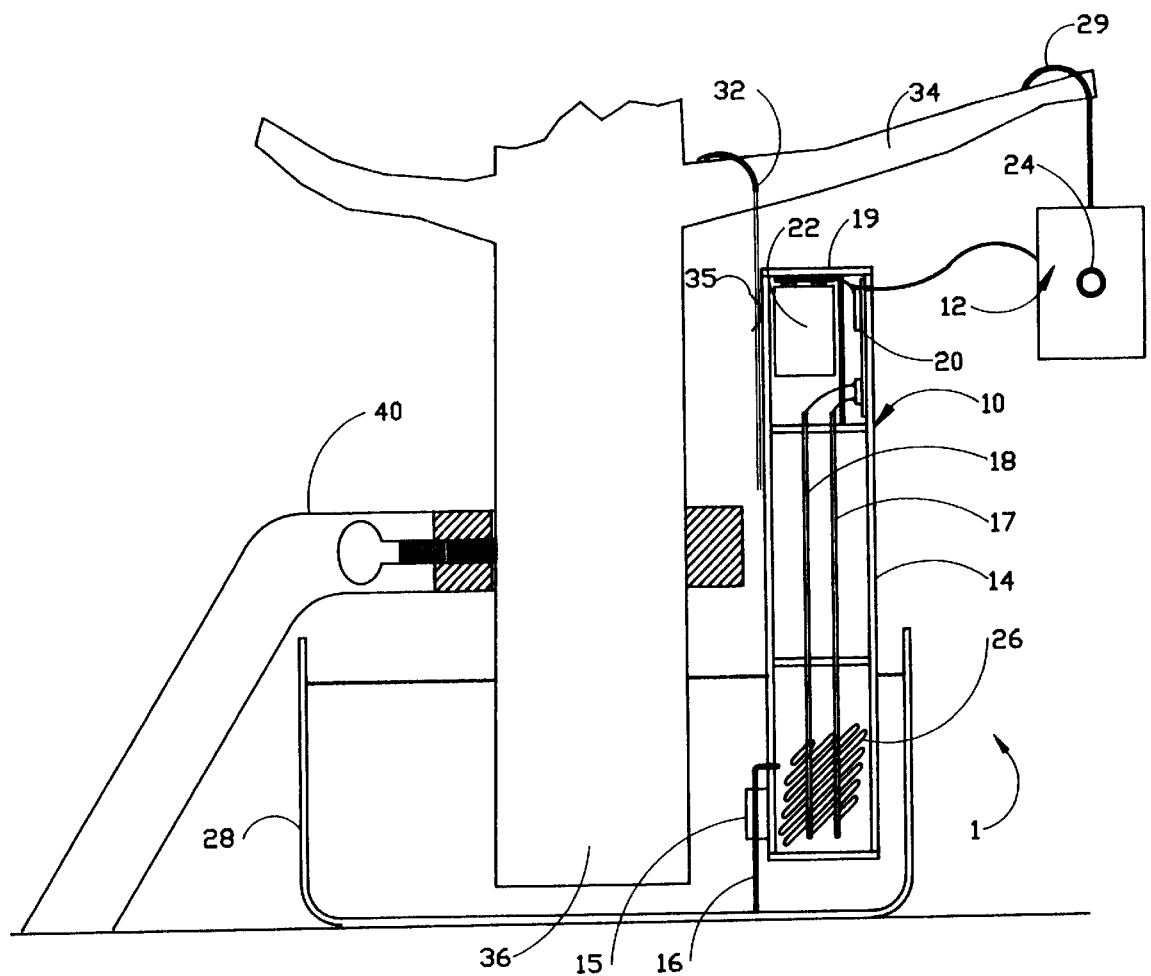
FIG. 1 is cross sectional detail of a detection assembly mounted on a Christmas tree in accordance with the present invention.

With reference now to the drawings, and particularly to FIG. 1, there is shown a cross sectional view of detection assembly of a low water indicator 1 mounted on a Christmas tree. The low water level indicator 1 includes a detection assembly 10 and an indicator unit 12. The detection assembly 10 comprises a first housing 14, a first electrode 17, a second electrode 18, and an electronic control circuit 20. With reference to FIG. 3, the housing 14 is preferably molded as a first half housing 19 and a second half housing 21 which are joined by an adhesive compound, ultrasonic welding or, any suitable assembly process. With reference to FIG. 3, a hook rod 32 is held by a top spring clip 35 which is disposed at substantially the top of the housing 14. With reference to FIG. 3a, an adjustment rod 16 is held by a first snap retainer 23 molded on the first half housing 19 at substantially the bottom thereof and a second snap retainer 27 molded on the second half housing 21 at substantially the bottom thereof. A rod cavity 30 is formed in the length of the first snap retainer 23 and the second snap retainer 27 to receive the adjustment rod 16. A plurality of support cavities are positioned at substantially the bottom of the first half housing 19 and the second half housing 21. The adjustment rod 16 helps maintain the height of the housing 14 relative to the bottom of the water container 28. At least one opening 26 is disposed in substantially the bottom thereof. The opening 26 allows water which flows inside the housing to drain into a water container 28. The adjustment rod 16 is used to adjust the height of the bottom of the housing 14 relative to a water container 28.

The electronic control circuit 20 is mounted in the top cavity 19 of the housing 14. The top cavity isolates the electronic control circuit 20 from moisture. The hook rod 32 is attached to a branch 34 of a tree 36 to provide stability to the placement of the detection assembly 10. A tree stand 40 is used to hold the tree 36. The first electrode 17 and the second electrode 18 are fabricated from copper or a copper alloy.

Figures 2A, 2B:
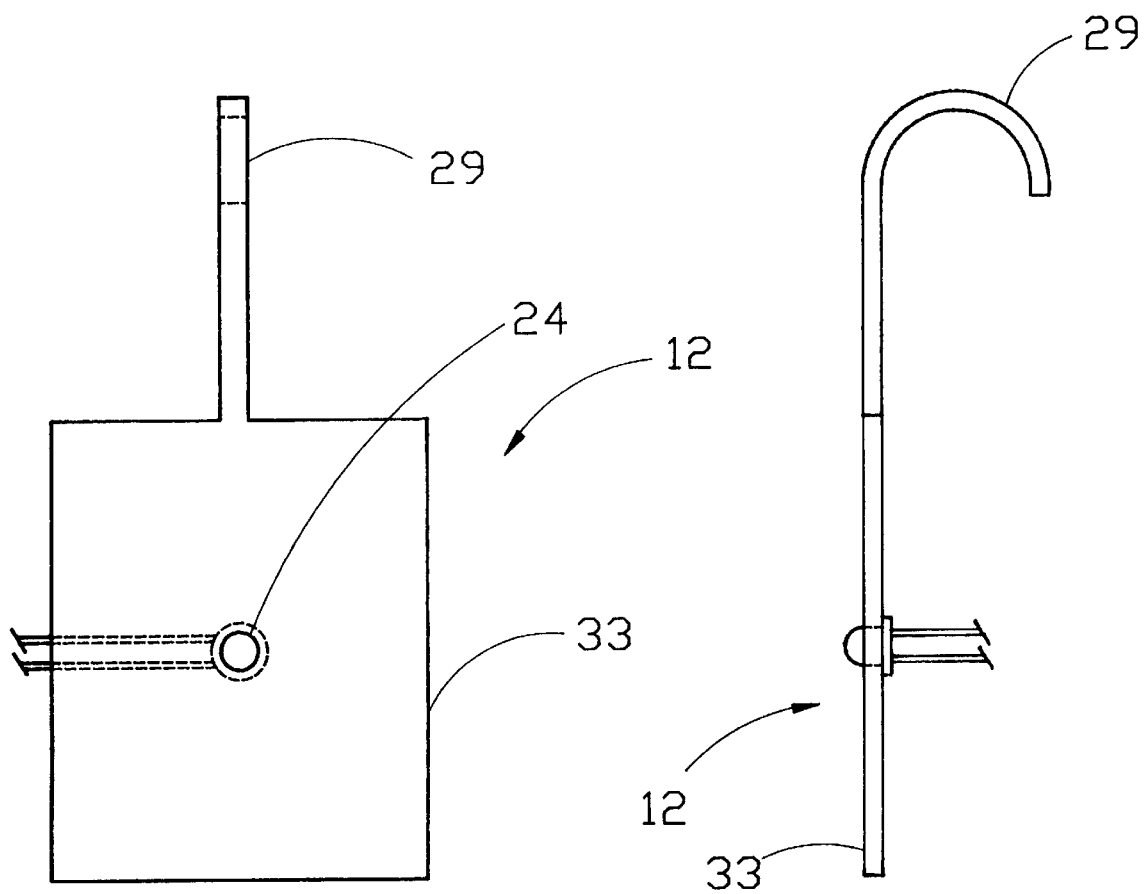
FIG. 2a is a front view of an indicator unit in accordance with the present invention.
FIG. 2b is a side view of an indicator unit in accordance with the present invention.

FIG. 2a and 2b show the indicator unit 12. The indicator unit 12 comprises a base plate 33, and an LED 24. The base plate 33 may be molded into any decorative shape, such as an angel, or nothing at all. The LED 24 is pressed into a hole in the base plate 33. A hook 29 or other attachment device may be used to fasten the indicator unit 12 to a branch of the Christmas tree 36.

Figure 4:
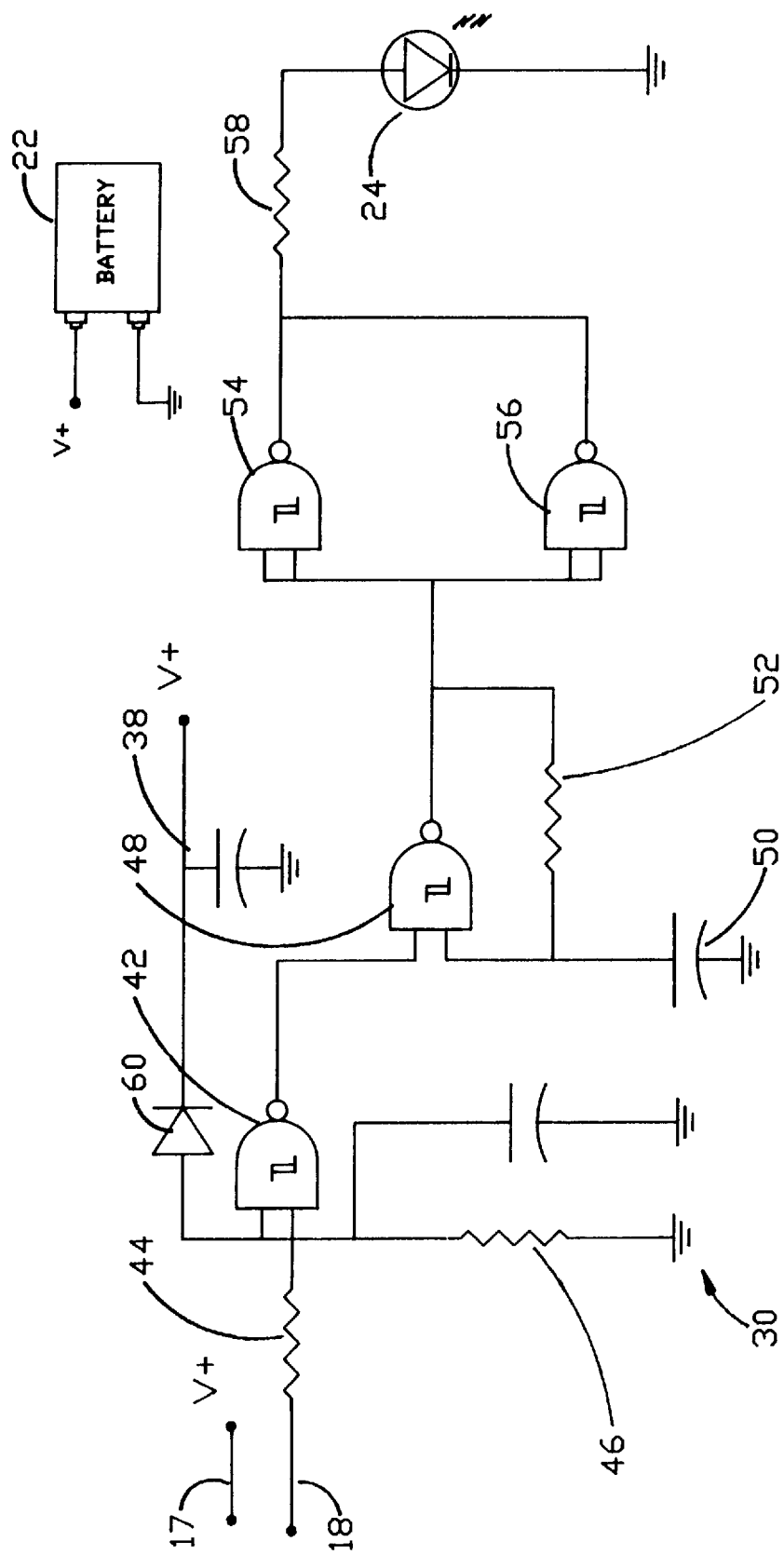
FIG. 4 is an electronic schematic of a the electronic control circuit in accordance with the present invention.

FIG. 4 shows an electronic schematic of the electronic control circuit 20. The first electrode 17 is connected to the positive of the battery 22. It is preferable that the battery 22 be a nine volt battery. The second electrode 18 is connected to the inputs of a first nand gate 42 through a current limiting resistor 44. The current limiting resistor 44 provides static protection and prevents false triggering from noise. The first nand gate 42 is used as a comparator. When current flows through the first electrode 17 into the second electrode 18 through the water, the inputs of the first nand gate 42 see a high voltage and the first nand gate 42 outputs a voltage low. When the water level is low, no current is sensed at the inputs to the first nand gate 42. The grounding resistor 46 pulls the inputs to a voltage low. The output of the first nand gate 42 is a voltage high.

The output of the first nand gate 42 is connected to an input of a second nand gate 48. A charging capacitor 50, a charging resistor 52, and the second nand gate 48 create an oscillator. A voltage high at the input of the second nand gate 48 causes thereof to output an oscillating signal. The oscillating signal is used to drive the LED 24 through a third nand gate 54, a fourth nand gate 56, and a current limiting resistor 58. The LED 24 may also be solidly lit by connecting the output of the first nand gate 42 to the inputs of the third nand gate 54, and the fourth nand gate 56. This connection avoids the oscillation produced by second nand gate 48. Diode 60 is used to protect the first nand gate 42 from static damage. Capacitor 38 is used to smooth the supply voltage from the battery 22.

The installation and operation of the low water level indicator works as follows. The adjustable rod 16 is pushed into the first snap retainer 23 and the second snap retainer 27 such that the height of the bottom of the housing 14 is approximately one inch from the bottom of the water container 28. The hook rod 32 is fastened to a branch 34 of the Christmas tree 36. Then the top spring clip 35 is squeezed together such that the hook rod 32 slides freely and the adjustable rod 16 contacts the bottom of the water container 28. The battery 22 is snapped into the battery connector 25 and dropped into the top of the housing 14.

The LED 24 will flashing until it is placed into water. The battery plate is slid into the top of the housing 14. The indicator unit 12 is hung on an out lying branch of the Christmas tree 36 or placed in a conspicuous spot. When the water level is too low, electrical current will no longer pass from the first electrode 17 to the second electrode 18 through the water. When current flow ceases between the first electrode 17 and the second electrode 18, the LED 24 will flash until the water level is raised.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A low water level indicator comprising:

a detection assembly having a housing, a first electrode, a second electrode, and an electronic control circuit, said first and second electrodes being electrically connected to said electronic control circuit;

a battery powering said electronic control circuit; and an indicator unit having a base plate, and an LED, said LED, and said battery being electrically connected to said detection assembly; and said electronic control circuit having a first schimdt trigger nand gate, said first schmidt trigger nand gate inputting the current from a DC voltage source through the water in a water container, when said water level is low, said first schmidt nand gate outputting a voltage high and having at least one additional schmidt trigger nand gate included in a oscillator and a driver circuit.

2. The low water level indicator of claim 1, further comprising:

said electronic control circuit having an oscillator connected between said first schmidt trigger nand gate and said LED, wherein when the level in the water container is low, said oscillator receiving the voltage high from said first schmidt trigger nand gate, said oscillator causing said LED to intermittently emit light.

3. The low water level indicator of claim 1, further comprising:

said housing having a top cavity at a top thereof, said electronic control circuit unit being retained in said top cavity, said electronic control circuit being isolated from moisture inside said top cavity.

4. The Low water level indicator of claim 3, further comprising:

a top spring clip being attached to said housing at substantially the top thereof; and a hook rod being inserted into said top spring clip, said hook rod becoming slidable when said top spring clip is squeezed, said hook rod facilitating the attachment to a branch of a Christmas tree.

5. The low water level indicator of claim 1, further comprising:

a hook being attached to a top of said indicator unit, said hook facilitating the attachment to a branch of a Christmas tree.

6. The low water level indicator of claim 1 wherein:

said housing having at least one opening in a side at substantially the bottom thereof.

7. The low water level indicator of claim 1, further comprising:

a first snap retainer being molded on to a first half housing a plurality of support cavities being formed in said first half housing above said first snap retainer;

a second snap retainer being molded on to a second half housing a plurality of support cavities being formed in said second half housing above said second snap retainer; and an adjustment rod being inserted between said first and second snap retainers and said support cavities.

8. A low water level indicator comprising:

a battery powering an electronic control circuit;

a detection assembly having a housing, a first electrode, a second electrode, and said electronic control circuit, said first and second electrodes being electrically connected to said electronic control circuit, said first electrode, said second electrode, said battery, and said electronic control circuit being contained within said housing, said battery being accessible through a battery plate;

an indicator unit having an LED, said LED being electrically connected to said detection assembly; and said electronic control circuit having a first schmidt trigger nand gate, said first schmidt trigger nand gate inputting the current from a DC voltage source through the water in a water container, when said water level is low, said first schmidt trigger nand gate outputting a voltage high to an oscillator and having at least one additional schmidt trigger nand gate included in a oscillator and a driver circuit.

9. The low water level indicator of claim 8, further comprising:

said housing having a top cavity at a top thereof, said electronic control circuit unit being retained in said top cavity, said electronic control circuit being isolated from moisture inside said top cavity.

10. The low water level indicator of claim 8 wherein:

said housing having at least one opening in a side at substantially the bottom thereof.

11. The Low water level indicator of claim 8, further comprising:

a top spring clip being attached to said housing at substantially the top thereof; and a hook rod being inserted into said top spring clip, said hook rod becoming slidable when said top spring clip is squeezed, said hook rod facilitating the attachment to a branch of a Christmas tree.

12. The low water level indicator of claim 8, further comprising:

said electronic control circuit having an oscillator connected between said schmidt trigger nand gate and said LED, wherein when the level in a water container is low, said oscillator receiving the voltage high from said nand gate, said schmidt trigger nand gate causing a LED to emit light.

13. The low water level indicator of claim 8, further comprising:

a hook being attached to a top of said indicator unit, said hook facilitating the attachment to a branch of a Christmas tree.

14. The low water level indicator of claim 8, further comprising:

a first snap retainer being molded on to a first half housing a plurality of support cavities being formed in said first half housing above said first snap retainer;

a second snap retainer being molded on to a second half housing a plurality of support cavities being formed in said second half housing above said second snap retainer; and an adjustment rod being inserted between said first and second snap retainers and said support cavities.

* * * * *